UNITED STATES PATENT OFFICE.

NEWCOMB K. CHANEY, OF LAKEWOOD, OHIO, ASSIGNOR, BY MESNE ASSIGNMENTS, TO NATIONAL CARBON COMPANY, INC., A CORPORATION OF NEW YORK.

ELECTRIC BATTERY.

1,287,634.  Specification of Letters Patent.  Patented Dec. 17, 1918.

No Drawing.   Application filed June 7, 1916.   Serial No. 102,193.

*To all whom it may concern:*

Be it known that I, NEWCOMB K. CHANEY, a citizen of the United States, residing at Lakewood, in the county of Cuyahoga and State of Ohio, have invented a certain new and useful Improvement in Electric Batteries, of which the following is a full, clear, and exact description.

This invention relates to electric batteries and is especially applicable to so-called dry cells.

Dry cells consist of a zinc can electrode in which is compacted an intimate mixture or "mix" as it is called, of carbon and manganese peroxid, usually pyrolusite, more or less dampened with ammonium chlorid electrolyte. The zinc can is separated from the mix by a bibulous lining, usually paper, which permits the electrolyte to reach it but prevents the insoluble constituents from passing through.

A common defect in dry cells is the corrosion of the zinc, regardless of whether the circuit is closed or not. I have made extensive experiments to determine the cause of such corrosion, and find that it is chiefly due to impurities in the mix. I have discovered that iron salts and sulfids in the granular carbon and soluble material from the pyrolusite, are the constituents chiefly responsible for the corrosive action. To eliminate such materials I have leached them with the electrolyte to be used in the cell, and then, after washing, have incorporated the purified materials in a dry cell. The open circuit voltage and short circuit current are increased by this treatment and shelf life tests have demonstrated that corrosion is very markedly decreased.

Since the electrolyte would be an expensive reagent to use for purification of the mix, I use preferably a mineral acid such as sulfuric, nitric or hydrochloric acid, to accomplish the same purpose. If one considers the iron sulfid as the harmful constituent, its deleterious effect may be nullified by dissolving it from the mix or by oxidizing it to insoluble compounds.

In accordance with the first process, hydrochloric or other acid may be used to react on the impurity in accordance with the following equation:—

$$FeS + 2HCl = FeCl_2 + H_2S.$$

The ferrous chlorid, being soluble, may be washed out from the mix, and the hydrogen sulfid escapes as a gas.

In accordance with the second process the impurity is oxidized into insoluble and harmless ferric hydroxid and free sulfur. This oxidation is more readily accomplished by first decomposing the ferrous sulfid with acid, and then applying the oxidizing agent, as air, chlorin, oxygen containing compounds, etc. The essential transformations are summarized in the reactions below:—

$$2FeS + 3H_2O + 3O = 2Fe(OH)_3 + 2S.$$

In an electrolyte of ammonium chlorid and zinc chlorid, such as is used in dry cells, any ferric salt will be decomposed and precipitated as insoluble $Fe(OH)_3$. Hence it is only necessary to get the ferrous sulfid in solution and oxidize the iron to the ferric condition, to render it insoluble and harmless under normal dry cell conditions. Similarly, such hydrogen sulfid as does not escape will be changed to insoluble free sulfur:—

$$H_2S + O = S + H_2O.$$

It is not absolutely necessary to use an acid solvent as described, since ferrous sulfid is soluble in the usual dry cell electrolyte of ammonium chlorid and zinc chlorid, and it will be oxidized by acting upon the cell mix with an oxidizing agent. Other solvents may also be used to dissolve the impurities preliminary to acting upon them with oxidizing agents.

Instead of removing the iron sulfid by the process previously set forth, this can be accomplished by spreading carbon and manganese peroxid moistened, for example, with dilute acid, in thin layers where it will be exposed to currents of warm air. The manganese peroxid being an oxidizing agent reacts on the acid mixture in the same way as the chlorin previously referred to. The purpose of spreading the mass in thin layers is to utilize the oxygen of the air as a further oxidizing means. Also to increase the action the materials may be heated to, say 100° C., and then the oxidation will be much more rapid.

The purification likewise can be accomplished by passing soluble or gaseous oxidizing agents around the carbon and manganese peroxid particles until the sulfid is oxidized to harmless forms. As examples of such agents I may mention potassium permanganate, hydrogen peroxid, bleaching powder, chlorin, iodin, etc.

The oxidizing materials should not be used in excess of the amount required by the reaction, or else the excess should be removed from the mix before placing it in the cell, but this will be readily accomplished by sufficient washing with water after which the material should be dried.

In case that hydrochloric acid is used to decompose the impurities, it is preferable to neutralize the surplus acid by adding zinc oxid in sufficient quantities to the cell mix rather than to remove it. The hydrochloric acid will react with the oxid to produce water and zinc chlorid which are necessary ingredients of the cell.

Cells made up of purified pyrolusite and carbon show an increased voltage of about 0.1 to .2 volts, an increase of short circuit current of about 4 to 6 amperes and a marked increase in shelf life.

The improvement in the characteristics of the dry cell, I believe, is due to the removal of ferrous sulfid as previously mentioned and of certain impurities in the pyrolusite, although I have determined that ferrous and sulfid ions each have a detrimental effect on the dry cell, regardless of the salt or material from which the ions may have dissociated.

Having described my invention, what I claim is:—

1. The process of treating a dry cell mix, which consists in wetting it with an acid solution to dissolve the ferrous sulfid therein, and then washing the mix with water.

2. The process of treating a dry cell mix, which consists in wetting it with an acid to dissolve the ferrous sulfid, and then oxidizing the ferrous ion to ferric ion insoluble in the ammonium-chlorid, zinc-chlorid electrolyte of a dry cell.

3. The process of treating the carbon to be used in a dry cell mix, which consists in wetting it with an acid, adding an oxidizing agent to it to oxidize the ferrous sulfid therein and adding zinc oxid to neutralize any excess acid.

4. The process of treating carbon to be used in a dry cell mix, which consists in mixing it with manganese peroxid, adding an acid thereto and freeing the mass of the surplus acid.

In testimony whereof, I hereunto affix my signature.

N. K. CHANEY.